(12) United States Patent
Chou

(10) Patent No.: US 7,075,737 B2
(45) Date of Patent: Jul. 11, 2006

(54) FIXED-ANGLE ROLLER MECHANISM

(75) Inventor: Alex Chou, Chung-Ho (TW)

(73) Assignee: Axisoft Technologies, Inc., Taipei (TW)

(*) Notice: Subject to any disclaimer, the term of this patent is extended or adjusted under 35 U.S.C. 154(b) by 0 days.

(21) Appl. No.: 10/897,066

(22) Filed: Jul. 21, 2004

(65) Prior Publication Data
US 2006/0018042 A1    Jan. 26, 2006

(51) Int. Cl.
*G02B 27/02*    (2006.01)

(52) U.S. Cl. ................ 359/798; 359/799; 359/694
(58) Field of Classification Search ............. 359/798, 359/694, 699, 799, 811, 820, 822, 823
See application file for complete search history.

(56) References Cited

U.S. PATENT DOCUMENTS 6,064,842 A * 5/2000 Takeuchi et al. ............ 399/111

* cited by examiner

*Primary Examiner*—Ricky Mack
*Assistant Examiner*—Brandi Thomas
(74) *Attorney, Agent, or Firm*—Sughrue Mion, PLLC; Joseph Bach, Esq.

(57) ABSTRACT

The invented fixed-angle roller mechanism comprises: a frame providing two bearings; a roller shaft supported by said bearings such to rotate along the axis of said roller shaft, which roller shaft is connected to a rotation element; an angle regulator provided on said roller shaft to limit rotation angle of said roller shaft; and an angle fixing means provided on said frame to couple with said angle regulator such that rolling angle of said roller shaft may be limited by said angle fixing means loosely; wherein said angle regulator regulates at least two rotation angles of said roller shaft.

16 Claims, 2 Drawing Sheets

FIXED-ANGLE ROLLER MECHANISM

FIELD OF THE INVENTION

The present invention relates to a fixed-angle roller mechanism, especially to a fixed-angle roller mechanism to be used in a rotation lens or similar rotation connector mechanism.

BACKGROUND OF THE INVENTION

In all kinds of electronic, computer and mechanical devices, using a rotation connector to connect an element to a main body, such that the element may rotate along an axis in relation to the main body and that the element may interact with the main body, is a popular arrangement. For example, in a digital camera, a rotation lens may be connected to the main body of the camera with a rotation connector, such that the rotation lens may rotate along an axis in parallel to the front end of the main body of the camera and that photographs may be taken by aiming at the targeted object at different shooting angles.

For such a rotation connector a roller mechanism shall be provided. In addition to the roller mechanism, a stopper means must be provided to limit the rotation of the roller mechanism, such that the element connected by the rotation connector may rotate freely and may be fixed at particular angles, when certain functions need to be provided.

When the rotation connector is used in electronic elements such as rotation lens, free rotation of the roller mechanism is not allowed. A major reason is that all electronic components need to be connected to the man body with wire cable or flexible flat cable. When the roller rotates to a certain angle, the wire cable or the flexible flat cable will be damages due to the dragging force of the rotation lens. In addition to this, the electronic element that is connected by the rotation connector has an effective working angle. Designer of the device shall provide a braking mechanism to prevent the element from rotating to an angle that exceeds the effective working angle, such that the roller mechanism, the wire cable, the flexible flat cable or the electronic element won't be damaged due to improper operation of the user.

Moreover, for the rotation lens of a digital camera or other electronic elements that interact with external system, the rotation of the element may actuate a switch that changes the function mode of the element. For example, most digital camera operates in different function modes when the rotation lens faces front and rear, respectively. When the rotation lens faces a cover, the operation of the lens shall be switched off. Such a switching function has become necessary to similar devices.

OBJECTIVES OF THE INVENTION

The objective of this invention is to provide a fixed-angle roller mechanism.

Another objective of this invention is to provide a fixed-angle roller mechanism whereby effective rotation angle thereof may be regulated.

Another objective of this invention is to provide a fixed-angle roller mechanism, in which function mode may be determined by regulating the fixed-angle rotation of the roller.

Another objective of this invention is to provide a fixed-angle roller mechanism to prevent damages brought to wire cable or flexible flat cable due to improper operation.

Another objective of this invention is to provide a fixed-angle roller mechanism that may be used in a digital camera.

SUMMARY OF THE INVENTION

According to the present invention, the fixed-angle roller mechanism comprises: a frame providing two bearings; a roller shaft supported by the bearings such to rotate along the axis of said roller shaft, which roller shaft is connected to a rotation element; an angle regulator provided on the roller shaft to limit the rotation angle of the roller shaft; and an angle fixing means provided on the frame to couple with the angle regulator such that the rolling angle of the roller shaft may be limited by the angle fixing means loosely; wherein the angle regulator regulates at least two rotation angles of the roller shaft.

In another embodiment of this invention, the rotation element is a rotation lens for digital camera. In a further other embodiment, the angle regulator comprises a scaled gear affixed to the rotation shaft, wherein the teeth of the gear are distributed in at least two angles. The scaled gear may be divided into separate tooth zones according to distribution angle of the teeth. In a yet other embodiment of this invention, a mode switch is provided to change the function mode of the rotation element according to rotation angle of the roller shaft, wherein the function mode comprises a front operation mode, a rear operation mode and an OFF mode. In a further embodiment, a stopper is provided to stop the rotation of the roller shaft.

These and other objectives and advantages of this invention may be clearly understood from the detailed description by referring to the following drawings.

DETAILED DESCRIPTION OF THE INVENTION

Figure 1:
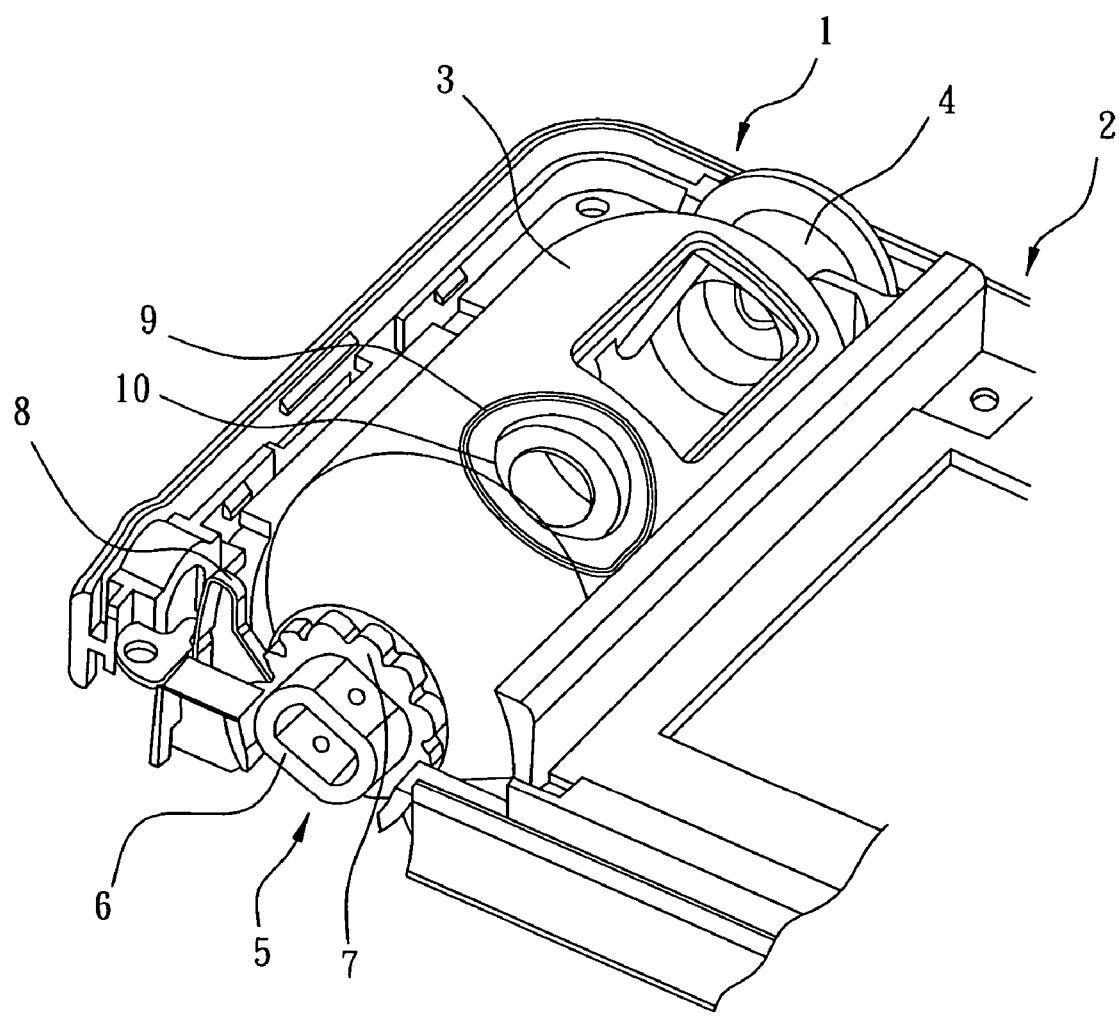
FIG. 1 shows the structure of the fixed-angle roller mechanism of this invention.

FIG. 1 shows the structure of the fixed-angle roller mechanism of this invention. As shown in this figure, the fixed-angle roller mechanism of this invention is supported in a frame 1. The frame 1 as shown in this figure is connected to the casing 2 of a digital camera, to support a rotation lens 3. Of course, the present invention is not limited to the illustrated application. It may be used in any electric, electronic and mechanism devices where a rotation connector is used.

On the frame 1, two bearings 4, 5 are provided to support a roller shaft 6. The roller shaft connects the rotation lens 3, such that when the roller shaft 6 rotates in the bearings 4, 5 along its axis, the rotation lens 3 rotates in the same direction and angle. A scaled gear 7 is provided in the roller shaft 6. A position spring 8 is provided in the frame 1. The extruder of the position spring 8 may enter into the grooves between teeth of the scaled gear 7, so to loosely regulate the rotation angle of the roller shaft 6. When the position spring 8 couples with the scaled gear 7, the rotation angle of the roller shaft may be fixed.

An opening 9 is provided on the rotation lens 3 and is covered by a transparent sheet 10. Inside the rotation lens 3, a lens (not shown) is positioned adjacent to the opening 9, such that photographs may be shot using the lens. The lens is fixed in the rotation lens 3, such that when the rotation lens 3 rotates, the viewing angle of the lens is changed. When the frame 1 is assembled with an upper casing and a lower casing (both not shown), a viewing window is provided on the upper casing to allow images to enter into the lens.

Figure 2:
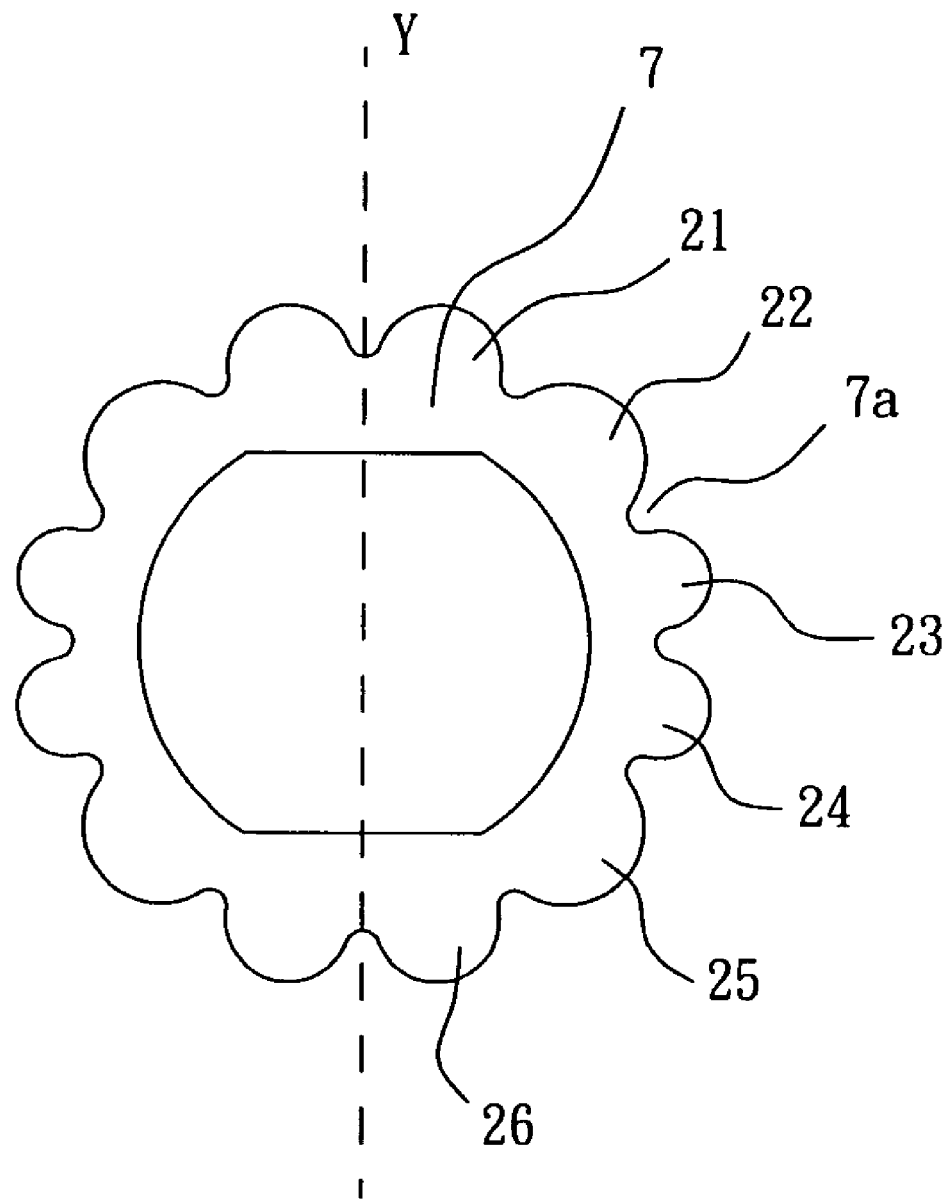
FIG. 2 shows the planar view of the scaled gear applicable in the fixed-angle roller mechanism of this invention.

The design of the scaled gear 7 will be described in the followings. FIG. 2 shows the planar view of the scaled gear 7. As shown in this figure, there are 12 teeth provided in the scaled gear 7. The scaled gear 7 is divided by the dotted line Y into two symmetric hemispheres, wherein shape and the distance of the teeth of one hemisphere are reflectively symmetric to that of the other. In this embodiment, each hemisphere of the gear 7 is divided into three zones. The first zone where teeth 21, 22 belong is called the invisible zone. When the roller shaft 1 rotates to where the position spring engages with the teeth of this invisible zone, the lens faces no image. The second zone where teeth 23, 24 belong is called the visible zone. When the roller shaft 6 rotates to where the position spring engages with the teeth of this visible zone, the lens faces images to be shot. The third zone where teeth 25, 26 belong is called the stop zone. The position spring can not engage with the teeth of this zone.

When the first zone passes by the position spring 8, a switch (not shown) is turned ON to generate a switch signal, which actuates a mirror function. The switch signal actuates changing of the function mode of the digital camera between the front mode and the back mode.

When the position spring 8 is engaged with the teeth of the first zone, the rotation lens is in the OFF mode, with which no photograph may be taken. In the second zone, the teeth are distributed in even angles, forming three gear grooves. When the position spring 8 engages with the teeth of this zone, three viewing angle of the rotation lens 3 are selectively formed. The third zone and its reflective zone form the stop zone. A mortise and a stopper (both not shown) are provided in the roller shaft 6 and the frame 1 respectively, which prevent the stop zone from being engaged by the position spring 8. As a result, the rotation angle of the roller shaft 6 and the rotation lens 3 is limited to a certain scope of a circumference. The wire cable or the flexible flat cable is prevented from being damaged due to improper dragging forces.

Under the above-described design, three viewing angles of the rotation lens 3 are provided, for both the front mode and the back mode. In addition, it is possible to provide more or less than 3 viewing angles to each hemisphere of the scaled gear. The teeth of each hemisphere may be distributed other than in even angles. The arrangement of the viewing angles in one hemisphere may be the same or different from that of the other.

In the embodiment as shown in FIG. 2, the distribution of the 3 zones in one hemisphere is 65 degrees, 50 degrees and 65 degrees. Of course, other distribution or ratio of angles may be applied.

In the actual application, an extruder is provided at the tangent surface of one terminal of the roller shaft 6 and an opening is formed in the internal of the scaled gear 7. By engaging the extruder to the opening, the rotation angle of the roller shaft 6 may be precisely controlled.

When the rotation lens 3 is assembled to the frame 1, the lens may not aim at the angles that correspond to the stop zones of the two hemisphere of the scaled gear 7. When the rotation lens 3 aims at the angles corresponding to the visible zones of the scaled gear 7, it may stop at the 3 viewing angles selectively. It is however possible for the user to select a viewing angle other than the three fixed angles. When the lens rotates to the angles corresponding to the invisible zone of the scaled gear 7, no image may be captured by the rotation lens 3. When the rotation lens 3 passes this zone, a switch is turned ON to switch the function mode of the digital camera.

The above describes the fixed-angle roller mechanism of this invention by taking the application of the rotation lens of digital camera for illustration purposes. Anyone skilled in the art may understand that the present invention may be used in any application, including any electric, electronic or mechanical device, where rotation connector is used. In addition, the angle regulator of this invention is not necessarily a scaled gear and a position spring. Any other mechanical or electronic device that regulates rotation angle and allows angle-difference rotation may be used in the present invention.

What is claimed is:

1. A fixed-angle roller mechanism, comprising:
   a frame providing two bearings;
   a roller shaft supported by said bearings such to rotate along the axis of said roller shaft, said roller shaft being connected to a rotation element;
   an angle regulator provided on said roller shaft to limit rotation angle of said roller shaft; and
   an angle fixing means provided on said frame to couple with said angle regulator such that rolling angle of said roller shaft may be limited by said angle fixing means loosely;
   wherein said angle regulator regulates at least two rotation angles of said roller shaft.

2. The fixed-angle roller mechanism according to claim 1, wherein said angle regulator comprises a scaled gear affixed to said rotation shaft.

3. The fixed-angle roller mechanism according to claim 2, wherein said teeth of said scaled gear are distributed in at least two angles.

4. The fixed-angle roller mechanism according to claim 3, wherein said scaled gear is divided into separate tooth zones according to distribution angle of said teeth.

5. The fixed-angle roller mechanism according to claim 4, wherein at least one tooth zone comprises teeth distributed in different angles.

6. The fixed-angle roller mechanism according to claim 1, further comprises a mode switch to change function mode of said rotation element according to rotation angle of said roller shaft.

7. The fixed-angle roller mechanism according to claim 6, wherein said function mode comprises a front operation mode, a rear operation mode and an OFF mode.

8. The fixed-angle roller mechanism according to claim 1, wherein a stopper is provided to stop rotation of said roller shaft.

9. The fixed-angle roller mechanism according to claim 1, wherein said rotation element is rotation lens for digital camera.

10. The fixed-angle roller mechanism according to claim 9, wherein said angle regulator comprises a scaled gear affixed to said rotation shaft.

11. The fixed-angle roller mechanism according to claim 10, wherein said teeth of said scaled gear are distributed in at least two angles.

12. The fixed-angle roller mechanism according to claim 11, wherein said scaled gear is divided into separate tooth zones according to distribution angle of said teeth.

13. The fixed-angle roller mechanism according to claim 12, wherein at least one tooth zone comprises teeth distributed in different angles.

14. The fixed-angle roller mechanism according to claim 9, further comprises a mode switch to change function mode of said rotation element according to rotation angle of said roller shaft.

15. The fixed-angle roller mechanism according to claim 14, wherein said function mode comprises a front operation mode, a rear operation mode and an OFF mode.

16. The fixed-angle roller mechanism according to claim 9, wherein a stopper is provided to stop rotation of said roller shaft.

* * * * *